(12) United States Patent
Braun (10) Patent No.: US 7,465,905 B2
(45) Date of Patent: Dec. 16, 2008

(54) METHOD AND DEVICE FOR CONNECTING OBJECTS BY MEANS OF AT LEAST ONE PLASTICISABLE CONNECTING ELEMENT

(75) Inventor: Hans-Dieter Braun, Frittlingen (DE)

(73) Assignee: Maschinenfabrik Spaichingen GmbH, Spaichingen (DE)

( * ) Notice: Subject to any disclaimer, the term of this patent is extended or adjusted under 35 U.S.C. 154(b) by 252 days.

(21) Appl. No.: 11/281,993

(22) Filed: Nov. 17, 2005

(65) Prior Publication Data

US 2006/0175729 A1    Aug. 10, 2006

(30) Foreign Application Priority Data

Nov. 25, 2004  (DE)  ........................ 10 2004 057 453

(51) Int. Cl.
*F23Q 7/00* (2006.01)
*F16L 9/00* (2006.01)
(52) U.S. Cl. ...................................... 219/265; 138/156
(58) Field of Classification Search ................ 219/260, 219/261, 262, 263, 264, 265, 266, 267, 268, 219/269, 270; 392/314; 138/156, 157, 158, 138/159, 160
See application file for complete search history.

(56) References Cited

U.S. PATENT DOCUMENTS

| | | | | |
|---|---|---|---|---|
| 4,736,507 A | * | 4/1988 | Berecz et al. | ............ 29/243.53 |
| 5,390,407 A | * | 2/1995 | Musil | ........................... 29/512 |
| 6,298,533 B1 | | 10/2001 | Nishimura et al. | |
| 6,649,114 B2 | | 11/2003 | Lochner et al. | |
| 6,752,886 B2 | | 6/2004 | Distel | |
| 2002/0017744 A1 | | 2/2002 | Lochner et al. | |
| 2002/0100534 A1 | | 8/2002 | Distel | |

FOREIGN PATENT DOCUMENTS

| | | |
|---|---|---|
| DE | 39 32 294 | 9/1989 |
| DE | 100 38 158 | 2/2002 |
| DE | 100 46 451 | 3/2002 |
| DE | 100 38 158 | 4/2004 |
| EP | 0 965 400 | 12/1999 |
| JP | 61-173921 | 8/1986 |

* cited by examiner

*Primary Examiner*—Daniel L Robinson
(74) *Attorney, Agent, or Firm*—Michael J. Striker (57) ABSTRACT

A method and a device for connecting objects by means of a connecting element which can be plasticised by heat, on which connecting element a rivet head is formed by means of a heatable cap having a small-volume configuration. The cap is heated by a heating element which is moveable together with it in the direction of the connecting element and is configured as a large-volume heat store. The heating element is separated from the cap after forming the rivet head but before withdrawal of the cap from the rivet head, in order to enable rapid cooling of the rivet head.

22 Claims, 6 Drawing Sheets

METHOD AND DEVICE FOR CONNECTING OBJECTS BY MEANS OF AT LEAST ONE PLASTICISABLE CONNECTING ELEMENT

CROSS-REFERENCE TO RELATED APPLICATIONS

This application claims priority under 35U.S.C. 119 (a)-(d) to German Patent Application DE 10 2004 057 453.7-14, filed Nov. 26, 2004.

FIELD OF THE INVENTION

The invention relates to a method and a device of the types indicated in the preambles of claims 1 and 5.

BACKGROUND OF THE INVENTION

Methods and devices of this type operate according to the so-called rivet dome welding principle, according to which firstly a connecting element which is fitted on one of the objects and has a projection formed thereon, the so-called rivet dome, is pushed through an opening of the other object and is then provided on the free end of the rivet dome with a moulded-on rivet head. The connecting element can also comprise a separate component which is pushed through both objects and has at one end an already previously applied head.

Moulding-on of the rivet head is effected by applying the described welding principle in that the rivet dome is plasticised by heating and, by means of of a tool which is subsequently described as a calotte or spherical cap and is pressed against the rivet dome, is brought into the form desired in the individual case. Generally at least one of the two assembly partners consists of a plasticisable plastic material although in principle it does however also suffice if solely the involved connecting elements or the rivet domes provided thereon are made of a plasticisable material.

Various methods are known for heating and plasticising rivet domes. For example ultrasonic welding is widespread (e.g. DE 100 46 451 A1). Ultrasonic vibrating tools, so-called sonotrodes, are hereby placed on the rivet domes in order to set the latter in high frequency vibrations and consequently to heat them in a very short time to their melting temperature. What is disadvantageous about this method is the high technical outlay and the fact that objects made of plastic material and metal cannot be connected together or only under certain conditions. The latter applies in particular when it concerns connecting objects which are sensitive to vibrations, as applies for example to high pitch loudspeakers which are intended to be incorporated in door linings of automotive vehicles.

In addition, methods and devices of the initially described types are known in which softening of the rivet domes is effected with the help of a previously heated cap which is brought into contact with the rivet domes. One problem resides hereby in that the heated cap, which should have as great a mass as possible in order to achieve high plasticising speeds, cannot be withdrawn from the rivet heads immediately after formation thereof. Rather, one must wait until the cap is cooled to a temperature which is significantly below the melting temperature of the rivet dome material since otherwise the danger exists that the rivet heads tear or the cap pulls threads. As a result, long welding times arise which can only be reduced to a tolerable amount by additional cooling devices.

Finally, methods and devices for contact-free transfer of heat to the rivet domes are known (e.g. EP 0 965 400 A2, DE 100 38 158 A1). Heated air is blown here against the rivet domes and/or the rivet domes are plasticised by electromagnetic radiation. A substantial disadvantage of this technique resides in the fact that the environment is also heated by the means provided for the heating and it is therefore difficult to control the process as a whole reproducibly. In addition, this is a reason why the heating times cannot be shortened arbitrarily.

SUMMARY OF THE INVENTION

Starting herefrom, the technical problem of the present invention resides in configuring the methods and devices of the initially described types such that the welding process can be implemented with a relatively low technical outlay and with a high process speed, i.e. with shorter cycle times than previously both for the plasticising phases and for the subsequent cooling phases.

The characterising features of claims 1 and 5 serve to achieve this object.

The invention offers the advantage that the cap can be given a comparatively small volume or a small mass, respectively. Nevertheless, rapid plasticisation of the rivet domes is possible on the one hand in that a sufficiently high-performance heating element is brought at least into the vicinity of the cap or applied to the latter. On the other hand, rapid cooling of the cap and hence of the rivet heads which are produced can also be achieved in that the heating element is removed from the cap during or directly after formation of the rivet heads.

Further advantageous features of the invention are revealed in the sub-claims.

BRIEF DESCRIPTION OF THE DRAWINGS

The invention is explained in more detail subsequently in embodiments in conjunction with the accompanying drawings. There are shown.

DETAILED DESCRIPTION OF A PREFERRED EMBODIMENT OF THE INVENTION

Figure 1:
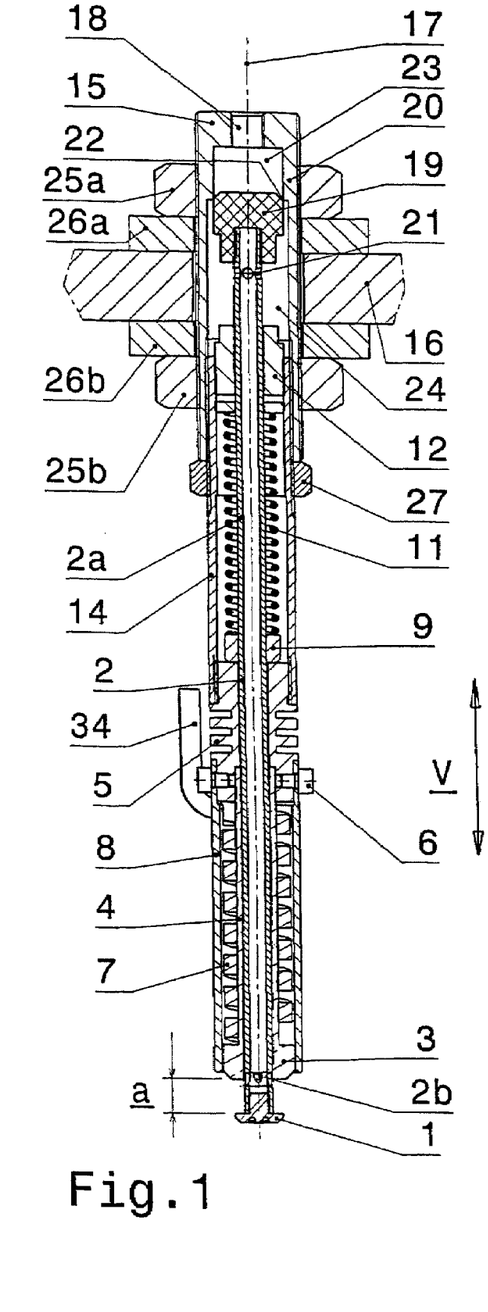
FIG. 1 a schematic longitudinal section through a device according to the invention for connecting objects by means of a plasticisable connecting element in an initial position.
Figure 2:
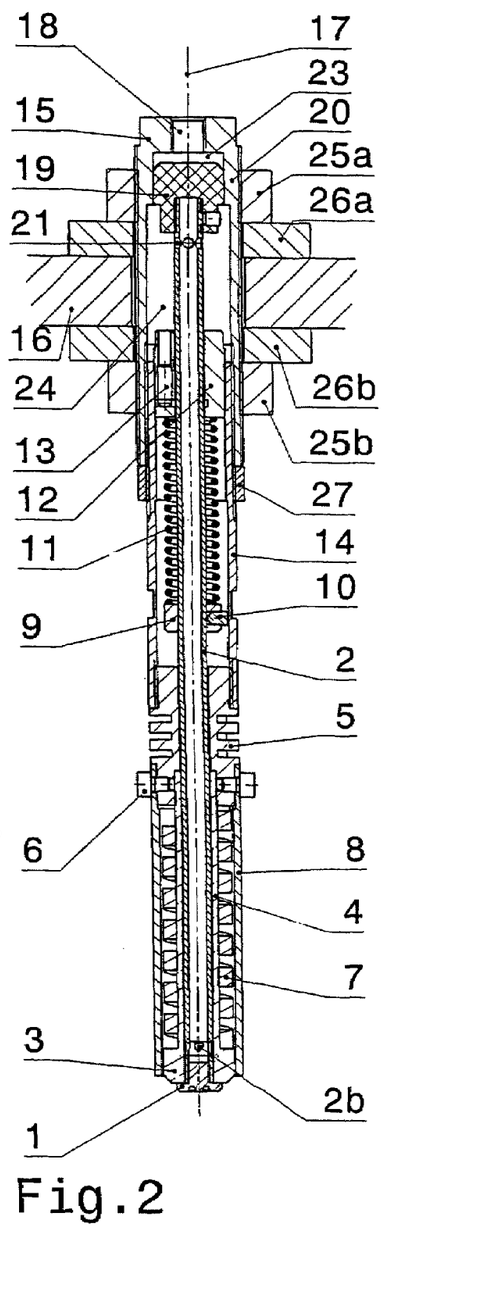
FIG. 2 a section corresponding to FIG. 1 but in an operating position and after rotation of the device by 90° about a longitudinal axis.
Figure 3:
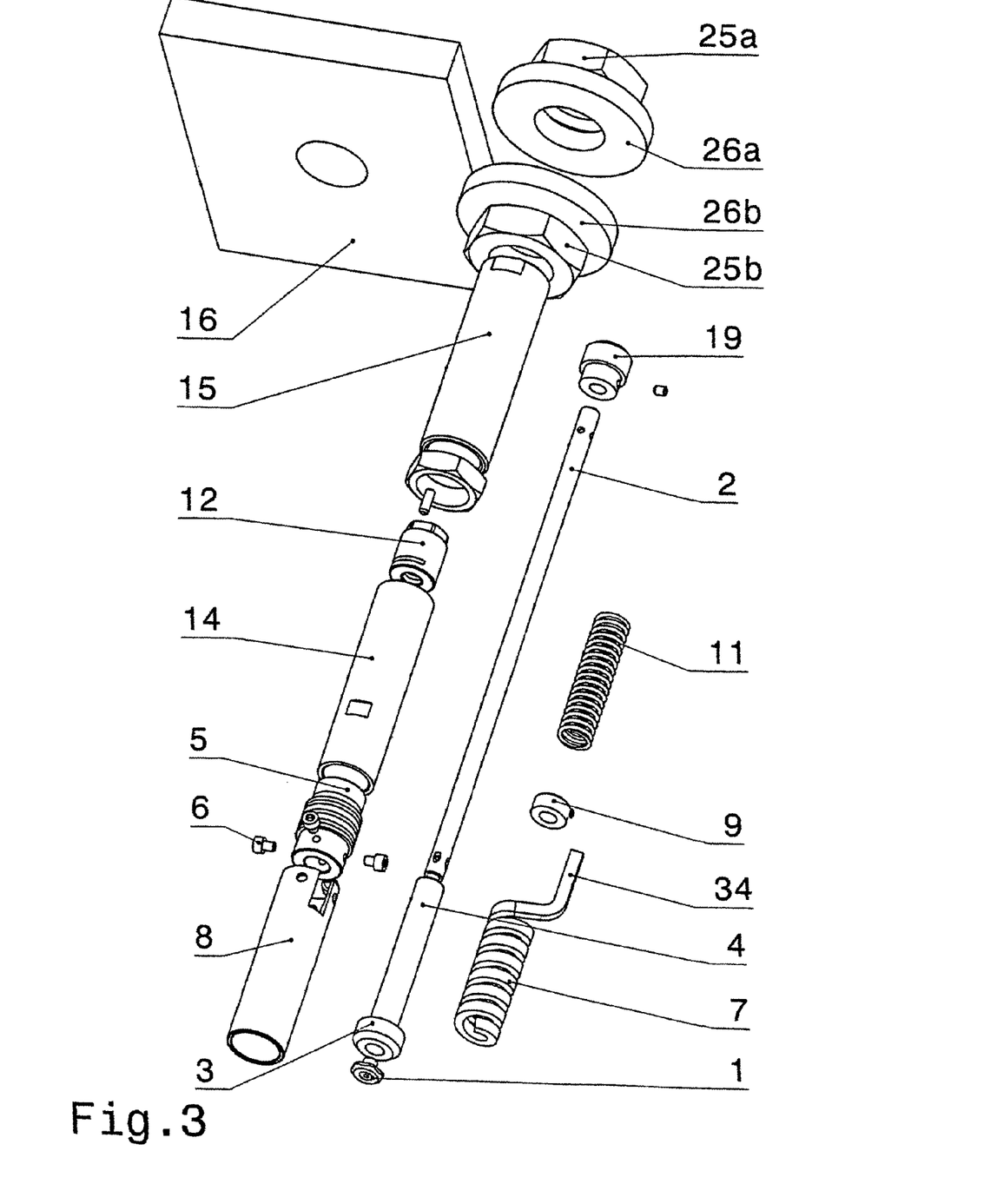
FIG. 3 a schematic and perspective representation of individual parts of the device in a representation where they are separated from each other.

According to FIG. 1 to 3, a device according to the invention for connecting objects by rivet welding contains a calotte or cap 1, not shown in more detail, which is adapted individually to the form and size of a rivet dome or a rivet head to be formed on the latter, likewise not shown. The cap 1 is provided at one end, a lower end in FIGS. 1 and 2, of a carrier pipe 2 and is mounted on this or fitted exchangeably. Furthermore a heating element 3 is assigned to the cap 1 and is provided at one end, a lower end in FIG. 1 and 2, of a further carrier pipe 4 and is moulded on the latter for example. The two carrier pipes 2 and 4 are disposed coaxially and inserted telescopically one in the other, expediently the carrier pipe 2 being disposed internally and the carrier pipe 4 externally. The two carrier pipes 2, 4 are in addition displaceable axially relative to each other preferably with a sliding fit and little clearance. As a result, it is possible to dispose the spherical cap 1 in an initial position evident in FIG. 1 in which it has a spacing $\underline{a}$ from the heating element 3 or, by relative displacement of the carrier pipes 2, 4, to move it into an operating position according to FIG. 2 in which it abuts on the heating element 3. The end faces which thereby come to abut are preferably planar.

At an end of the outer carrier pipe 4 spaced from the heating element 3, an insulator 5 is provided which is mounted for example by means of a screw 6 and comprises or consists of a material, such as e.g. titanium or a ceramic material which is a poor conductor of heat, whilst the heating element 3 and the carrier pipe 4 are preferably produced from a material which conducts heat well and stores it well. In addition, a heat source 7 is assigned to the outer carrier pipe 4 and preferably comprises a continuously operable, electrical heating coil which is wound around the carrier pipe 4. The outer space between the heating element 3 and the insulator 5 is surrounded by a protective pipe 8.

The inner carrier pipe 2 is longer than the outer carrier pipe 4 and protrudes through the insulator 5 with a central portion 2a. In a region which protrudes out of the insulator 5 on the side orientated away from the cap 1, a hollow-cylindrical adjustment ring 9 is drawn onto the central portion 2a and fixed thereon by means of a screw 10. In the initial position in which the carrier pipe 2 is pushed forwards furthest in the direction of the heating element 3, the adjustment ring 9 abuts on the insulator 5 (FIG. 1). In this initial position, the cap 1 has the spacing $\underline{a}$ from the heating element 3 so that this spacing a can be changed within the required limits by actuation of the screw 10 and axial displacement of the adjustment ring 9 on the carrier pipe 2.

The described initial position is achieved in addition by a force which can be gravity for example in the vertical arrangement of the device corresponding to FIGS. 1 and 2, as long as the friction between the carrier pipes 2 and 4 is sufficiently low. Preferably, this force is applied at least partially by a spring 11. In the embodiment, the spring 11 is a helical spring which is drawn onto the central portion 2a of the carrier pipe 2 and, on the one hand, supported on the adjustment ring 9 and, on the other hand, on a further, preferably hollow cylindrical adjustment ring 12. This adjustment ring 12 is, on the one hand, pushed onto the carrier pipe 2 on a side of the adjustment ring 9 orientated away from the insulator 5 and guided thereon axially displaceably and, on the other hand, fixed with a clamping screw 13 in a free end of a further protective pipe 14 which is connected on a side of the insulator 5 orientated away from the protective pipe 8 firmly to said insulator and covers the spring 11 externally. By axial adjustment of the adjustment ring 12 in the protective pipe 14 in one or the other direction, the axial spacing between the insulator 5 and the further adjustment ring 12 and hence the force can be adjusted, by means of which the cap 1 is prestressed in its initial position according to FIG. 1.

At one end remote from the insulator 5, the protective pipe 14 has an outer threaded portion and is screwed with the latter into an inner threaded portion of a preferably hollow cylindrical housing 15 which together with the described parts forms a riveting tool and has an outer threaded portion which serves to fix the riveting tool on a carrier plate 16.

The carrier plate 16 is a component of a feed unit, not shown, which is known per se and is for example pneumatically actuatable, by means of which the entire device which is mounted thereon and has the riveting tool can be moved to and fro parallel to a double arrow $\underline{v}$ and parallel to a longitudinal axis 17 of the riveting tool.

The described riveting tool has furthermore means for cooling the cap 1. The inner carrier pipe 2 for example, which is provided with radial cooling slots 2b (FIG. 1) at its end bearing the cap 1, forms a component of these means. In a first variant, the housing 15, into which an end of the carrier pipe 2 which is remote from the cap 1 protrudes, is provided in addition with a connection 18 for a gaseous cooling medium, in particular air, or if necessary also nitrogen. If required, the cooling medium can therefore be conducted via the connection 18 into the housing 15, from where it is then conducted through the carrier pipe 2 to the cooling slots 2b thereof. Discharge of the cooling medium at another position of the housing 15 is prevented in particular by the sealing screw connection thereof to the protective pipe 14.

According to a further variant of the device according to the invention, the force of the spring 11 is if required assisted or replaced by pneumatic means. A piston 19 which is mounted on the end of the inner carrier pipe 2 which is disposed in the housing 15, serves for this purpose. The piston 19 is guided with a sliding fit in a cylindrical part of the housing 15 which operates as a pneumatic cylinder 20, is mounted displaceably in the direction of the double arrow $\underline{v}$ and is thereby disposed for example between the connection 18 and the further adjustment ring 12. The arrangement thereby is such that, when connecting the connection 18 to a pressure source, the pressure medium which is used attempts to move, starting from the operating position according to FIG. 2, either the piston 19 and the cap 1 therewith or, in the case of a secured carrier pipe 2, conversely the housing 15 and the heating element 3 therewith, into the initial position evident in FIG. 1.

A modification of the described embodiment is produced by combining the means for cooling the cap 1 and the pneumatic means. For this purpose, the carrier pipe 2 has, on the one hand, radial transverse borings 21 between the further adjustment ring 12 and the piston 19. On the other hand, the unit formed from the piston 19 and the cylinder 20 is configured in this case such that, during connection of the connection 18 for example to a compressed air source, firstly the initial position evident in FIG. 1 between the piston 19 and the cylinder 20 is produced and, upon reaching this initial position, an annular gap 22 is then uncovered between the piston 19 and the cylinder 20, as is likewise evident in FIG. 1. This annular gap 22 produces a flow-type connection between the connection 18 and a housing part 23 situated between the latter and the piston 19, on the one hand, and a housing part 24 situated on the other side of the piston 19, the transverse borings 21, the inner carrier pipe 2 and the cooling slots 2b, on the other hand, so that the pressure medium can simultaneously flow out as cooling medium through the cooling slots 2b as long as the latter are opened.

The described device is operated essentially as follows:

Firstly the adjustments required for a welding task are undertaken. For this purpose, the desired dimension a is preselected by means of the adjustment ring 9 and, by means of the further adjustment ring 12, the force of the spring 11 is adjusted in that the adjustment ring 12 is fixed axially on the protective pipe 14 by means of the clamping screw 13 when the housing 15 has been removed. Finally the housing 15 is screwed onto the protective pipe 14 and thereafter fixed, with the help of nuts 25a, 25b which are screwed on both sides of the carrier plate 16 onto its outer threaded portion and plain washers 26a and 26b laid therebetween, at such a height on the carrier plate 16 that the riveting tool performs the stroke required for riveting in the case of a movement to and fro of the carrier plate 16 which is effected for example with pneumatic means. With a lock nut 27 screwed onto the protective pipe 14, the axial position of said protective pipe on the housing 15 can be ensured in addition.

Figure 4:
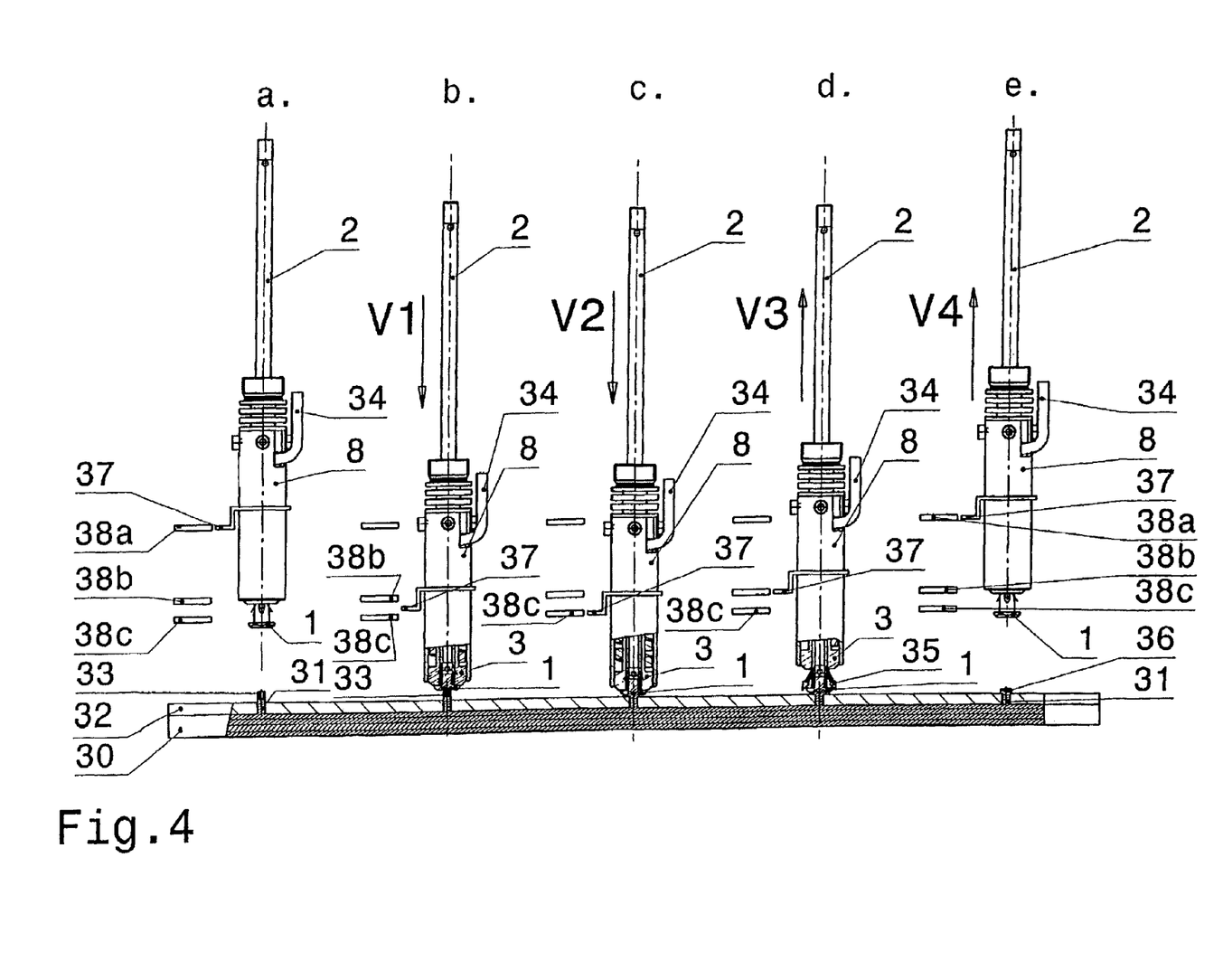
FIG. 4 in partially sectioned views, the device according to FIG. 1 to 3 in five different positions during a complete welding cycle.

The movements of the device required to implement a riveting cycle are produced in particular in FIG. 4. This shows schematically a first object 30 on which a connecting element 31 is moulded and a second object 32 which, at the desired connecting point, has a hole through which a rivet dome 33 of the connection element 31 protrudes.

As the position a in FIG. 4 shows, the described device is initially disposed above the connecting element 31 and coaxially to the rivet dome 33 thereof, the riveting tool adopting the initial position according to FIG. 1. The device is then pushed forwards corresponding to the position b of FIG. 4 in the direction of an arrow v1 into a position in which the cap 1 just touches the free end of the rivet dome 33 orientated towards said cap. This has the result that the inner carrier pipe 2 of the cap 1, when the device drops further in the direction of an arrow v2, in opposition to the effect of a force, which can be for example gravity or the force of the spring 11, is pushed gradually deeper into the outer carrier pipe 4 until the cap 1 is placed with its upper end face against the lower end face of the heating element 3 and the position c in FIG. 4 is reached. The heating source 7 or the heating coil thereof is at this time connected via a connection contact 34 to a current source in a manner not shown in more detail so that the outer carrier pipe 4 and hence also the heating element 3 are heated to a temperature which is required for the welding process.

Because of the mutual contact of the cap 1 and of the heating element 3, the heat energy stored in the latter is transferred very rapidly and effectively to the cap 1 and from the latter to the connecting element 31 or the rivet dome 33. The material of the rivet dome 33 therefore begins to melt, the molten material penetrating into the cap 1 upon further lowering of the device in the direction of the arrow v2 and gradually forming a rivet head 36 (FIG. 4*e*). The cap 1 and the heating element 3 are thereby tracked in the direction of the arrow v2 in common with the plasticising rivet dome 33 preferably until the cap 1 has reached the surface of the object 32 or the desired rivet dome root, as the position c in FIG. 4 shows.

In order to cool the formed rivet head, the device including the outer carrier pipe 4 is now raised again somewhat via the housing 15 and in the direction of an arrow v3 in order consequently to separate or to lift off the cap 1 axially from the heating element 3, as the position d. in FIG. 4 shows. If the carrier plate 16 is actuated with a pneumatic cylinder/piston arrangement, raising of the carrier pipe 4 can for example be effected in that the cylinder/piston arrangement is connected without pressure. Because the cap 1 is retained in a stationary manner on the object 32 or on the formed rivet head, now for example the spring 11 can raise the housing 15, the carrier plate 16 and hence also the outer carrier pipe 4 axially in the direction of the arrow v3 via the further adjustment ring 12 until the adjustment ring 9 abuts on the insulator 5 and the initial position evident in FIG. 1 is achieved with the spacing a between the cap 1 and the heating element 3. The cap 1 thereby remains for the moment still in the position evident from the position d. of FIG. 4.

At the same time, the cap 1 can be cooled from the exterior for example with a blown air source, not shown. However the application of the cooling means illustrated in the embodiment is particularly advantageous. According thereto, the cooling slots 2*b* are fitted axially in such a position on the inner carrier pipe 2 that they are covered and sealed in the position thereof which is evident in FIG. 2 by the heating element 3 or by the outer carrier pipe 4, but during displacement of the inner carrier pipe 2 into the initial position according to FIG. 1 gradually emerge from the carrier pipe 4 or the heating element 3 and are then uncovered. Hence, now a cooling airflow, which is supplied to the connection 18, conducted through the inner carrier pipe 2 and introduced for example at a point remote from the cap 1 into the carrier pipe 2, can discharge and be directed at least partially towards the cap 1 in order to cool the formed rivet head, as is indicated by arrows 35 in the position d. of FIG. 4.

If in this mode of operation, use is made in addition of the piston 19 in FIGS. 1 and 2, the axial raising of the housing 15 and of the outer carrier pipe 4 can be effected or assisted by a pressure and cooling medium introduced via the connection 18 into the housing part 23. This pressure and cooling medium then enters after formation of the annular gap 22 through the piston 19 acting also as a valve across the housing part 24 and the transverse borings 21 into the inner carrier pipe 2 and as a result decisively effects cooling in the described manner. The spring 11 can be configured comparatively weakly in this case so that it counteracts production of the operating position according to position c. in FIG. 4 with only little resistance.

After sufficiently low cooling of the plasticised material of the rivet dome 33 below the plasticising temperature, the device is moved back again into the initial position by actuation of the feed unit in the direction of an arrow v4, which is illustrated in position e. of FIG. 4 and corresponds to position a. of FIG. 4. The rivet head 36 moulded on the rivet dome 33 by means of the described welding cycle then holds the two objects 30, 32 together firmly. Subsequently, a further welding cycle can be prepared.

Figure 5:
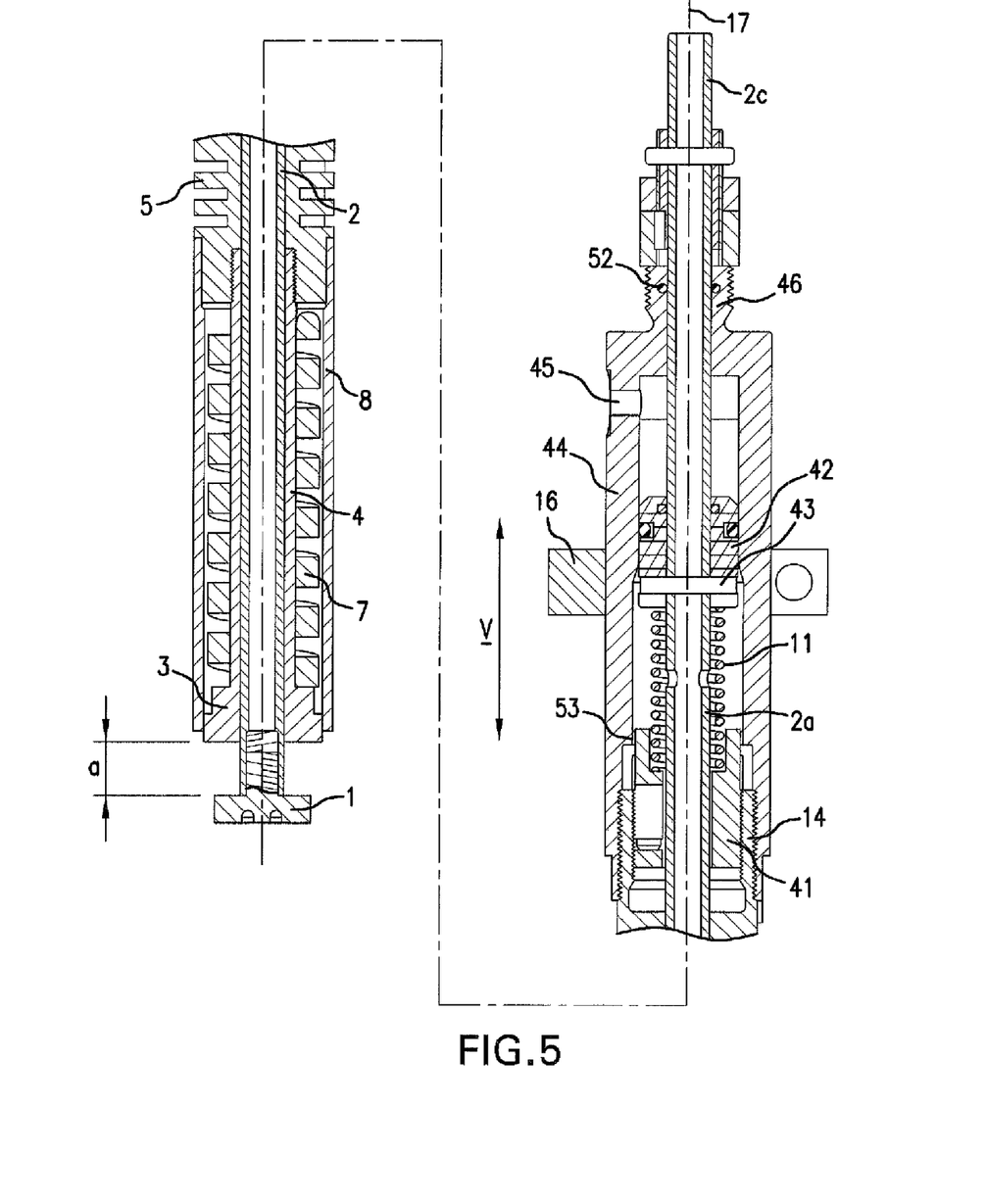
FIGS. 5 to 7 views corresponding to FIGS. 1, 2 and 4 of a second embodiment of the device according to the invention.
Figure 6:
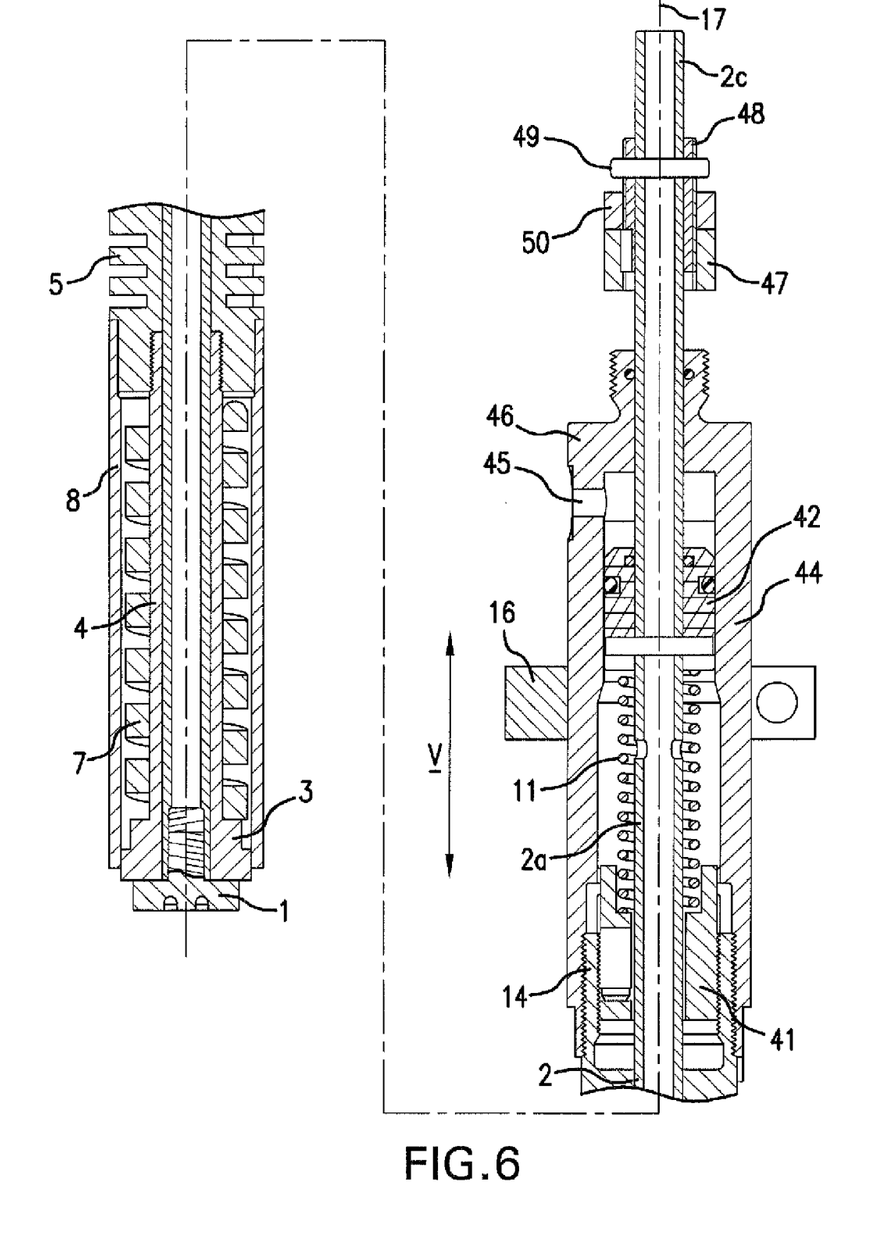
Figure 7:
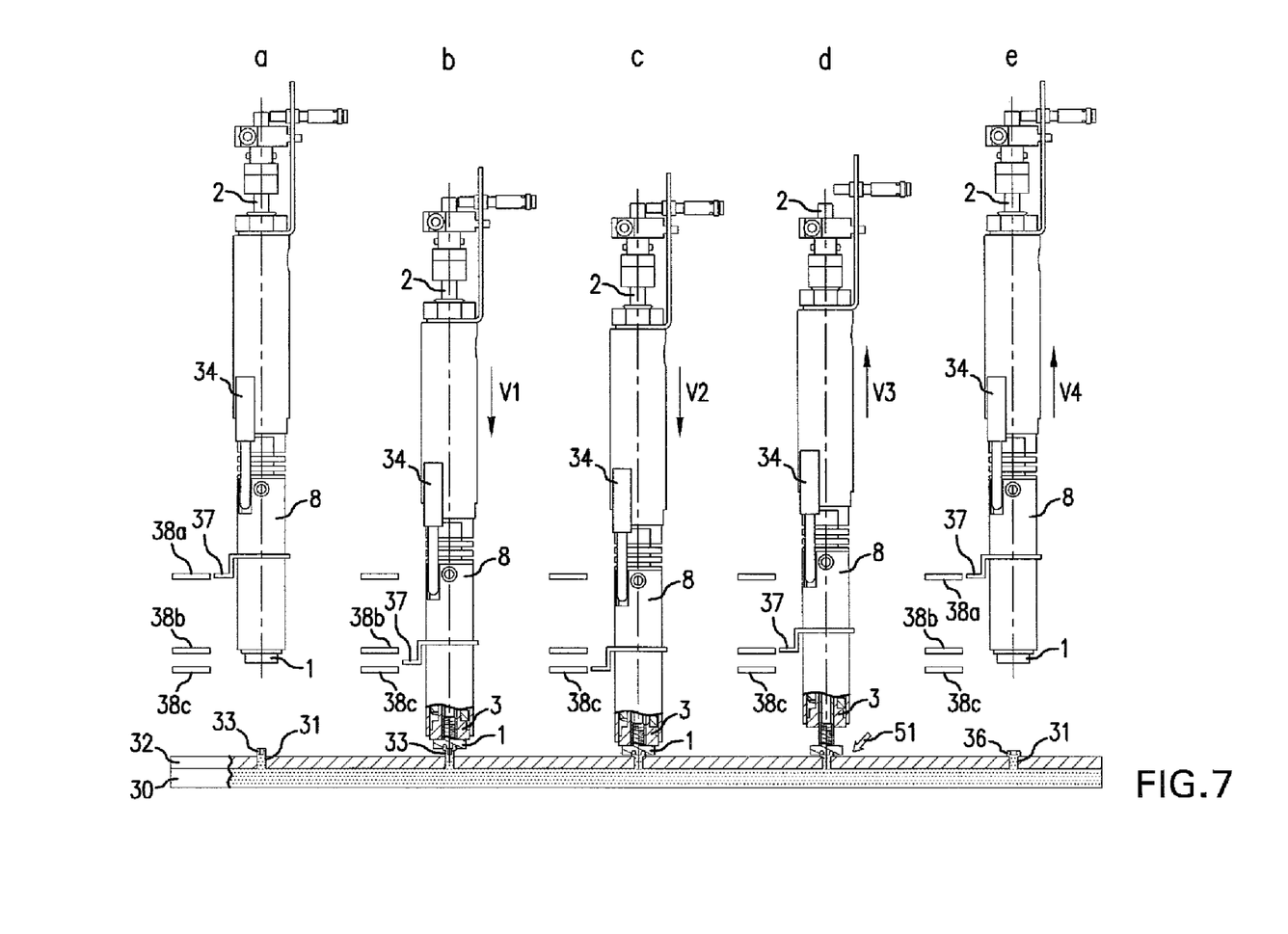

FIG. 5 to 7 show a second embodiment of the device according to the invention which is considered at present to be the best, the same parts being provided with the same reference numbers as in FIG. 1 to 4. In particular, in the case of the second embodiment, as FIGS. 5 and 6 show, also the calotte or cap 1, the carrier pipe 2, the heating element 3, the further carrier pipe 4, the insulator 5, the heating device 7, the protective pipes 8 and 14, the spring 11, the carrier plate 16 and the longitudinal axis 17 are present with essentially the same function.

In contrast to FIG. 1, the cap 1 abuts here in its initial position on the heating element 3 (FIG. 6). This initial position is achieved as in FIG. 1 by the force of the spring 11, but the spring 11 has a different operational direction relative to FIG. 1. This results from the fact that a preferably hollow cylindrical adjustment ring 41, which corresponds essentially to the adjustment ring 12 (FIG. 1) and is mounted in the vicinity of the insulator 5 on the inner side of the protective pipe 14, supports the lower end of the spring 11 in FIGS. 5 and 6, whilst an upper end of the spring 11 abuts on a piston 42 which is similar to the piston 19 according to FIGS. 1 and 2 and which is mounted by means of a transverse pin 43 on the central portion 2*a* of the carrier pipe 2. The piston 42 is thereby disposed on a side of the adjustment ring 41 which is orientated away from the insulator 5, and the axial spacing of the ring 41 from the piston 42 can be adjusted by axial adjustment of the adjustment ring 41. As a result, the force is also adjusted at the same time, by means of which the piston 42 and hence the carrier pipe 2 is axially prestressed in a direction orientated away from the heating element 3 and hence the cap 1 is pressed in the initial position according to FIG. 6 against the heating element 3.

The shortened protective pipe 14 in FIGS. 5 and 6 has an outer threaded portion at the end remote from the insulator 5, onto which outer threaded portion an inner threaded portion of a hollow cylindrical housing 44 is screwed. This housing 44 has a connection 45 for a pressure medium, in particular compressed air, forms a riveting tool with the other parts visible in FIGS. 5 and 6 and is provided with an outer threaded portion which serves for fixing the riveting tool on the carrier plate 16 (cf. also FIGS. 1 and 2).

The internal periphery of the housing 44 serves as cylinder, in which the preferably cylindrical piston 42 is guided with a sliding fit and is mounted displaceably in the direction of the double arrow $v$. The arrangement is thereby such that the connection 45 is disposed in the initial position according to FIG. 6 between the end face of the piston 42 remote from the adjustment ring 41 and an upper closing cover 46 of the housing 44. When connecting the connection 45 to a compressed air source or the like, the used pressure medium will therefore displace the piston 42, starting from the initial position according to FIG. 6, in opposition to the force of the spring 11 into an operating position according to FIG. 5.

The adjustment of the spacing $a$ (cf. FIGS. 1 and 5) is effected in the second embodiment with means which are readily accessible from the exterior. For this purpose, an end portion 2c of the carrier pipe 2 which is extended outwards beyond the central portion 2a is guided axially to the exterior through the closing cover 46 of the housing 45 and provided with an adjustment nut 47, the axial spacing of which from the closing cover 46 corresponds exactly to the value $a$. The adjustment nut 47 is for example either screwed directly onto a threaded portion of the end portion 2c or onto a sleeve 48 which is provided with an outer thread and is pushed onto the end portion 2c, which sleeve is mounted by a transverse pin 49 on the end portion 2c. After adjustment of the spacing $a$ by means of the adjustment nut 47, the axial position thereof is secured expediently with a lock nut 50.

In order to prevent the cooling air flowing through the carrier pipe 2 according to FIGS. 1 and 2 being heated too greatly in the region of the heating device 7 before it reaches the cap 1, the cooling air is blown directly on the cap 1, preferably with not-shown pipes or the like, in the embodiment according to FIGS. 5 and 7.

The device visible in FIGS. 5 to 7 is operated essentially as follows:

Initially the necessary adjustments are undertaken as in the embodiment according to FIGS. 1 to 4. In particular, an expedient spacing $a$ is adjusted by means of the adjustment nut 47. The movements of the device required thereafter for implementation of a riveting cycle emerge from FIG. 7.

In contrast to FIG. 1 to 4, the cap 1 abuts on the heating element 3 in the initial position according to FIG. 6 and position a. of FIG. 7. As a result, the cap 1 is already preheated before lowering the device onto the rivet dome 33. Continuous heating of the cap 1 takes place therefore until the position c in FIG. 7 is reached, as a result of which the processing time can be further reduced. Otherwise, the device operates analogously to FIG. 4 until position c in FIG. 7 is reached.

In order to cool the formed rivet head 36, the device is now raised by the housing 44, at the same time the not-shown compressed air source or the like being switched on and as a result the piston 42 being moved in opposition to the force of the spring 11 in the direction of the adjustment ring 41, until the adjustment nut 47 strikes against the closing ring 46, i.e. the spacing $a$ is achieved (FIG. 5 and position d in FIG. 7). As a result, the cap 1 is spaced sufficiently far away from the heating element 3 so that it can cool down and if necessary can be cooled with additional blown air (arrow 51 in position d of FIG. 7). It is clear that the housing 44 will be sealed relative to the carrier pipe 2 and the adjustment ring 41 by means of gaskets 52, 53, and that the piston 42 will be sealed relative to the carrier pipe 2 and the housing 44 by means of gaskets 54, 55, so far as this is necessary.

After adequate cooling of the cap 1, the device is raised from the finished rivet head 36 according to position e. in FIG. 7 (cf. also position e. in FIG. 4). The pressure is thereby removed at the same time from the connection 45, so that the cap 1 can return into its initial position according to FIG. 6 under the effect of the spring 11. At the same time, the cooling air can hence be switched off again.

Otherwise, the mode of operation of the device according to FIGS. 5 to 7 corresponds to the mode of operation of the first embodiment described above with reference to FIGS. 1 to 4.

Numerous advantages of the invention are evident from the described mode of operation. It is possible in particular to provide the heating element 3 with a substantially greater mass or a substantially greater volume than the e.g. spherical cap 1 in order consequently to accelerate the plasticising process without simultaneously impeding the cooling process following thereafter. This is achieved in that, on the one hand, the heating element 3 can be configured to be comparatively large for the purpose of forming a large heat store and consequently the heat energy stored therein can be transferred comparatively rapidly to the small cap 1 and via the latter to the rivet dome 33 as long as the cap 1 abuts on the heating element 3 during the heating or plasticising phase. On the other hand, the cooling process can likewise be effected rapidly because the heat store or the heating element 3 is separated from the cap 1 during the cooling phase and the latter can therefore absorb no more heat energy. This applies even when, in order to further reduce the welding duration, the heating device 7 remains constantly switched on in a preferred manner and if necessary is actuated with a control circuit and a temperature sensor integrated for example in the heating device 7 such that the heating element 3 permanently adopts a specific temperature above the plasticising temperature of the rivet dome 33. The previously existing contradiction between the requirement for a large quantity of heat to be stored, on the one hand, which is a prerequisite for a large mass of the cap 1, and the requirement for a small mass for the same cap 1 in order to achieve rapid and efficient cooling of the rivet head 36 until solidification, is avoided effectively according to the invention by the possibility of separating the cap 1 from the heating element 3. Apart from that, the advantage is produced that the tracking of the device at least from the position b to the position c in FIGS. 4 and 7 can be implemented and ended at optimal speed because the plasticising process can be controlled better than before. In addition, the small mass of the cap 1 enables rapid cooling of the rivet head 36 with the help of an external cooling medium. The overall required heating or cooling phases are therefore comparatively short when using the device according to the invention. This applies in particular when the heating element 3 and if necessary the carrier pipe 4 comprise a good heat-conducting material with high heat retaining capacity, when the inner carrier pipe 2 conducts the heat poorly and when the cap 1 is a component made of a good heat-conducting material which is inserted if necessary in an exchangeable manner into the carrier pipe 2. Finally, a further advantage of the invention resides in the fact that the insulator 5 prevents heat transfer from the carrier pipe 4 to other parts of the device.

As is indicated in FIGS. 4 and 7, the required positions of the described device can be monitored by means of a tracing element 37 which is mounted for example on the protective pipe 8 and by means of a plurality of sensors 38a to 38c which are assigned to the tracing element 37. A sensor 38a thereby indicates the initial position according to position a and e in FIGS. 4 and 7. A sensor 38*b* emits a signal when the riveting tool has reached that position in which the cap 1 is situated on the rivet dome 33 and which has just been exceeded in position b of FIGS. 4 and 7. Finally, a sensor 38*c* signals reaching of the lowest provided position of the device so that this sensor 38*c* can be used to effect a reversal of the direction of movement of the feed unit according to v2 into the direction of movement according to arrow v3 or switching off of the pneumatics in order to achieve the position according to position d in FIGS. 4 and 7. After a preset time duration which is required for cooling, the return of the device into the position e. according to FIGS. 4 and 7 is effected.

If a plurality of rivetings is intended to be undertaken simultaneously in order to implement a welding task, a corresponding number of devices can be inserted one next to the other into the carrier plate 16 so that the carrier plate 16 performs the required movement strokes simultaneously for all these devices, if necessary with different stroke lengths corresponding to the selected settings. Such a procedure is expedient relative to the normal single arrangement however only when the axes of the different rivet domes are disposed essentially parallel to each other and essentially have similar dimensions which lead to similar heating and cooling durations.

The invention is not restricted to the described embodiments which can be modified in many ways. This applies for example to the geometric configuration of the heating element 3 and of the associated heating device 7 which can be also configured differently from that illustrated. It is thereby not absolutely necessary, even if particularly advantageous, that the heating element 3 physically contacts the cap 1 during the plasticising phase since, according to the type of heating device, a rapid and intense transfer of heat to the cap 1 is possible even without direct contact. Furthermore, it is clear that the connecting element 31 (FIG. 4) can be a separate element which protrudes through the two objects 30, 32 and is provided on its rear side with a moulded-on head. Furthermore, the descriptions "rivet or rivet dome welding" within the scope of the present invention should also include so-called pin welding which differs from the described rivet dome welding in principle only in that the rivet domes 31 have a hollow cylindrical configuration, i.e. are provided respectively with a central hole. Furthermore, means other than those represented for separating or for bringing together the cap 1 and the heating element 3 can be provided. Finally it is understood that the different features can be applied also in combinations other than those described and illustrated.

The invention claimed is:

1. A device for connecting objects (30,32) by means of at least one connecting element (31) which can be plasticised by heat, containing a riveting tool which can be moved forwards and backwards in the direction of the connecting element (31) and has a cap (1) for forming a rivet head (36) on the connecting element (31) and a heating element (3) for heating the cap (1), wherein the heating element (3) is disposed on the riveting tool moveably relative to the cap (1) and is separable from the cap (1) before withdrawing the cap (1) from the rivet head (36) in order to accelerate the cooling, and wherein means (11, 18, 19, 23, 42, 45) are provided for generating a force acting between the heating element (3) and the cap (1) in the course of separating the heating element (3) form the cap (1), which force retains the cap (1) in a stationary manner on one of objects (30,32) or on the formed rivet head (36).

2. The device according to claim 1, wherein the heating element (3) is configured as a heat store.

3. The device according to claim 2, wherein the heating element (3) has a greater volume than the cap (1).

4. The device according to claim 2, wherein the heating element (3) comprises a good heat-conducting material.

5. A device, for connecting objects (30, 32) by means of at least one connecting element (31) which can be plasticised by heat, containing a riveting tool which can be moved forwards and backwards in the direction of the connecting element (31) and has a cap (1) for forming a rivet head (36) on the connecting element (31) and a heating element (3) for heating the cap (1), wherein the heating element (3) is disposed on the riveting tool moveably relative to the cap (1) and wherein the riveting tool contains two coaxially disposed carrier pipes (2, 4), one of which is mounted telescopically displaceably in the other carrier pipe, and wherein the heating element (3) is provided at one end of one of the carrier pipes (4) and the cap (1) at one end of the other one of the carrier pipes (2) in such a manner that the heating element (3) and the cap (1) can be moved towards each other or removed from each other by relative displacement of the two carrier pipes (2, 4).

6. The device according to claim 5, wherein the cap (1) is provided at an inner carrier pipe (2) and the heating element (3) at an outer carrier pipe (4) and the outer carrier pipe (4) is provided with a heating device (7) which can be switched on continuously.

7. The device according to claim 6, wherein the cap (1) is retained by a force in an initial position in which the cap (1) has a preselected spacing (a) from the heating element (3), and wherein the cap (1) can be moved towards the heating element (3) in opposition to this force.

8. The device according to claim 7, wherein an end of the outer carrier pipe (4), which is remote from the heating element (3), has an insulator (5) and the inner carrier pipe (2) contains a central portion (2*a*) which protrudes through the insulator (5), said central portion being provided, in a region which protrudes out of the insulator (5) and is remote from the cap (1), with a first adjustment ring (9) which abuts on the insulator (5) in the initial position and consequently fixes the spacing (a) of the cap (1) from the heating element (3).

9. The device according to claim 8, wherein the force is applied at least partially by a spring (11) which is supported between the first adjustment ring (9) and a further adjustment ring (12) which is intended for adjustment of the spring force, said adjustment ring (12) being fitted on a side of the first adjustment ring (9) which is oriented away from the cap (1) on a protective pipe (14) which surrounds the inner carrier pipe (2).

10. The device according to claim 9, wherein the further adjustment ring (12) is mounted on the protective pipe (14) by means of a clamping screw (13).

11. The device according to claim 10, wherein the protective pipe (14) protrudes into a housing (15) which is intended for mounting the riveting tool on a carrier plate (16) and is connected to said housing detachably.

12. The device according to claim 6, wherein the cap (1) is retained by the force of a spring (11) in an initial position in which it abuts on the heating element (3), and in that the cap (1) can be raised from the heating element (3) in opposition to the force of the spring (11).

13. The device according to claim 12, wherein an end of the outer carrier pipe (4) which is remote from the heating element (3) has an insulator (5) and the inner carrier pipe (2) contains a central portion (2*a*) which protrudes through the insulator (5), said central portion being guided in a sliding manner in an adjustment ring (41) in a region which protrudes out of the insulator (5) and is remote from the cap (1) and being connected rigidly to a piston (42) at a spacing from said adjustment ring (41), the spring (11) being supported between the adjustment ring (41) and the piston (42), and in that the piston (42) is mounted displaceably in a housing (44) which has a connection (45) for a pressure medium on a side of the piston (42) which is oriented away from the spring (11).

14. The device according to claim 13, wherein the piston (42) is displaceable in opposition to the force of the spring (11) by a dimension which corresponds to a spacing (a) of the cap (1) from the heating element (3) in an operating position.

15. The device according to claim 14, wherein the inner pipe (2) protrudes with one end portion (2*c*) out of the housing (44) and the end portion (2*c*) is provided with means (47 to 50) for adjusting the spacing (a).

16. The device according to claim 9, wherein the spring (11) is a helical spring drawn onto the central portion (2*a*) of the inner carrier pipe (2).

17. The device according to claim 11, wherein the device has means for cooling the cap (1).

18. The device according to claim 17, wherein the means for cooling contain the inner carrier pipe (2) and the inner carrier pipe (2) is installed for guiding a gaseous cooling medium and is provided with radial cooling slots (2*b*) at the end provided with the cap (1).

19. The device according to claim 18, wherein an end of the inner carrier pipe (2) which is remote from the cap (1) protrudes into the housing (15) and the housing (15) is provided with a connection (18) for the gaseous cooling medium.

20. The device according to claim 11, wherein the force can be applied at least partially by pneumatic means.

21. The device according to claim 20, wherein the pneumatic means have a cylinder (20) which is configured on the housing (15), in which cylinder a piston (19) mounted on the inner carrier pipe (2) is guided with a sliding fit and which cylinder is open towards a connection (18) configured in the housing (15) for a pressure medium.

22. The device according to claim 21, wherein: the pneumatic means are parts of the means for cooling, the pressure medium forms the cooling medium, the inner carrier pipe (2) between the further adjustment ring (12) and the piston (19) is provided with radial transverse borings (21), and the housing (15) can be displaced by the pressure medium into a position in which an annular gap (22) which connects the connection (18) to the transverse borings (21) is produced between the piston (19) and the cylinder (20).

* * * * *